United States Patent
Tsuji et al.

(10) Patent No.: US 10,178,279 B2
(45) Date of Patent: Jan. 8, 2019

(54) IMAGE FORMING DEVICE, NON-TRANSITORY COMPUTER READABLE MEDIUM, AND IMAGE FORMING METHOD FOR COLOR CORRECTION

(71) Applicant: FUJI XEROX CO., LTD., Tokyo (JP)

(72) Inventors: Ryosuke Tsuji, Kanagawa (JP); Takashi Nakajima, Kanagawa (JP); Takaya Nagasaki, Kanagawa (JP); Seiji Shiraki, Kanagawa (JP); Kiyoshi Une, Kanagawa (JP); Shinji Hanaoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 184 days.

(21) Appl. No.: 15/203,505

(22) Filed: Jul. 6, 2016

(65) Prior Publication Data
US 2017/0180609 A1    Jun. 22, 2017

(30) Foreign Application Priority Data
Dec. 17, 2015   (JP) .................... 2015-246115

(51) Int. Cl.
*H04N 1/60* (2006.01)
*H04N 1/00* (2006.01)

(52) U.S. Cl.
CPC ........ *H04N 1/6008* (2013.01); *H04N 1/00408* (2013.01); *H04N 1/00795* (2013.01); *H04N 1/6016* (2013.01); *H04N 2201/0081* (2013.01); *H04N 2201/0094* (2013.01)

(58) Field of Classification Search
CPC .... H04N 1/60; H04N 1/6008; H04N 1/00408; H04N 1/6052
USPC .......................................................... 358/518
See application file for complete search history.

(56) References Cited

U.S. PATENT DOCUMENTS 6,404,511 B1 * 6/2002 Lin .................. H04N 1/6027
358/1.9

FOREIGN PATENT DOCUMENTS

| CN | 104079797 A | 10/2014 |
|----|-------------|---------|
| JP | 2007-142901 A | 6/2007 |

OTHER PUBLICATIONS

Jul. 24, 2018 Office Action issued in Chinese Patent Application No. 201610663484.7.

* cited by examiner

*Primary Examiner* — Jamares Q Washington
(74) *Attorney, Agent, or Firm* — Oliff PLC

(57) ABSTRACT

An image forming device includes an image forming unit that forms an image on a recording medium in response to an input of image data representing the image, a reading unit that reads a first image formed by the image forming device, and a second image formed by another image forming device to respectively generate a first read image and a second read image, the first image and the second image being formed based on identical image data, a discrimination unit that discriminates the first read image and the second read image from each other, and a color correction unit that performs, on the image formed by the image forming unit, a color correction that cancels out a difference in color between the first read image and the second read image.

3 Claims, 16 Drawing Sheets

FIG. 7
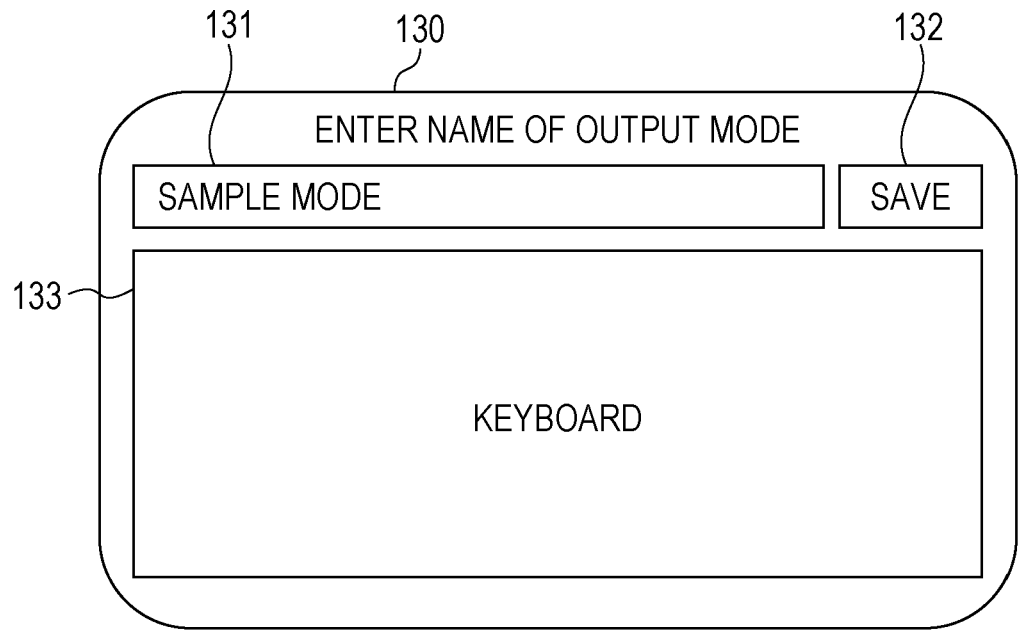
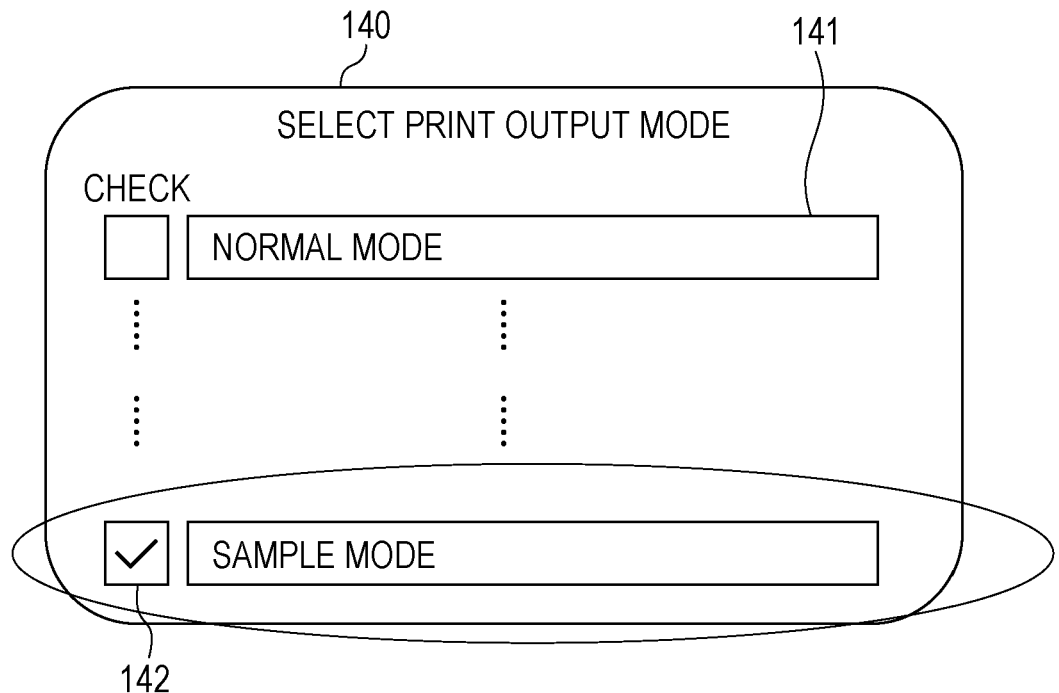

IMAGE FORMING DEVICE, NON-TRANSITORY COMPUTER READABLE MEDIUM, AND IMAGE FORMING METHOD FOR COLOR CORRECTION

CROSS-REFERENCE TO RELATED APPLICATIONS

This application is based on and claims priority under 35 USC 119 from Japanese Patent Application No. 2015-246115 filed Dec. 17, 2015.

BACKGROUND

Technical Field

The present invention relates to an image forming device, a non-transitory computer readable medium, and an image forming method.

SUMMARY

According to an aspect of the invention, there is provided an image forming device including an image forming unit that forms an image on a recording medium in response to an input of image data representing the image, a reading unit that reads a first image formed by the image forming device, and a second image formed by another image forming device to respectively generate a first read image and a second read image, the first image and the second image being formed based on identical image data, a discrimination unit that discriminates the first read image and the second read image from each other, and a color correction unit that performs, on the image formed by the image forming unit, a color correction that cancels out a difference in color between the first read image and the second read image.

BRIEF DESCRIPTION OF THE DRAWINGS

Exemplary embodiment of the present invention will be described in detail based on the following figures, wherein:

FIG. 7 illustrates a screen for saving and selecting an output mode;

DETAILED DESCRIPTION

Exemplary embodiment of the present invention will be described below with reference to the drawings.

Figure 1:
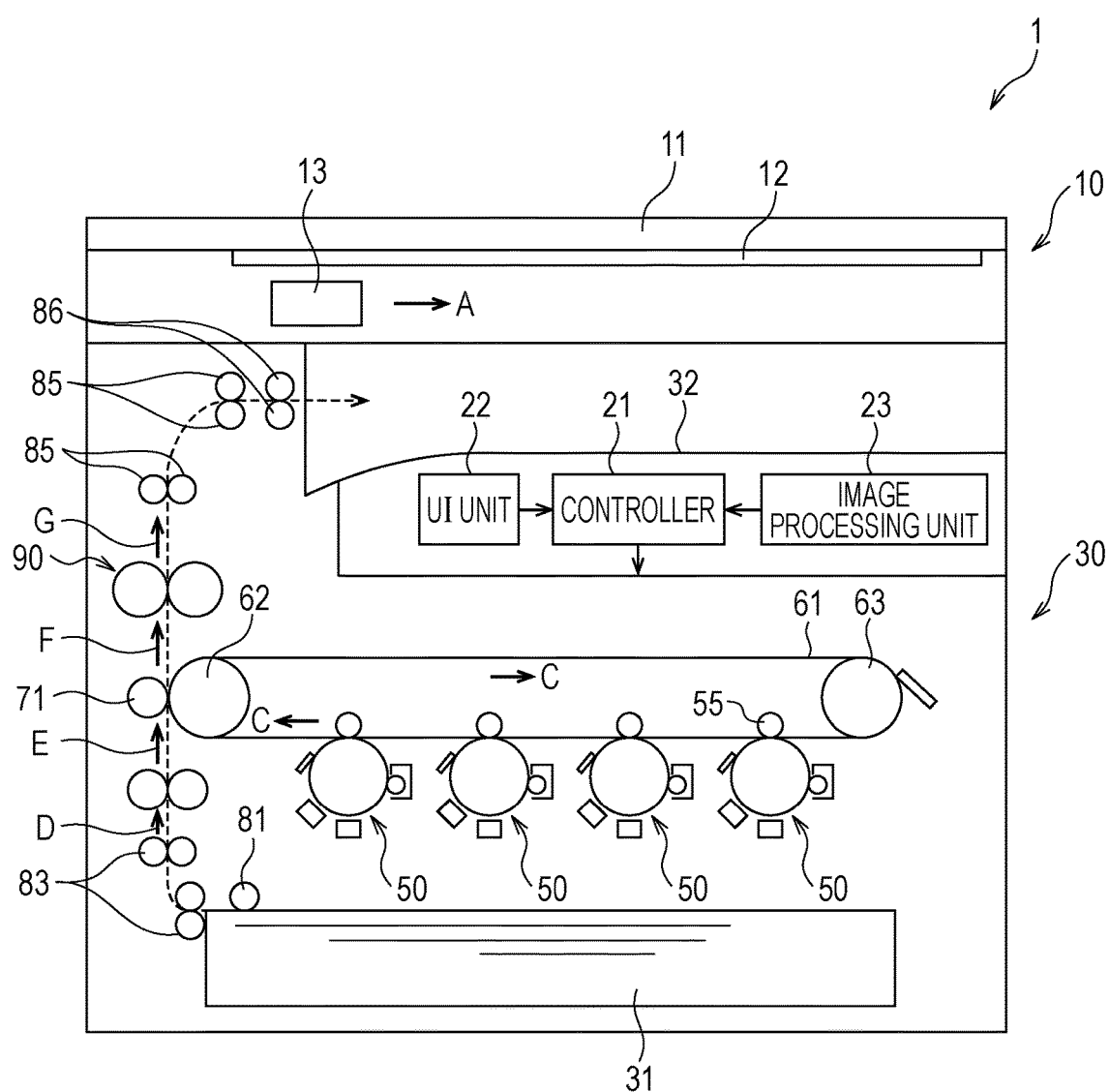
FIG. 1 is a schematic diagram of a multifunction device corresponding to an image forming device according to an exemplary embodiment of the invention.

FIG. 1 is a schematic diagram of a multifunction device corresponding to an image forming device according to an exemplary embodiment of the invention.

A multifunction device 1 includes, in its upper part, an image reading unit 10 that reads an image from a document. The image reading unit 10 includes a lid 11 that opens and closes with a hinge as its axis of rotation, a platen glass 12 that is disposed immediately under the lid 11, and an image reading sensor 13 that is further disposed below the platen glass 12. To read an image by the image reading unit 10, the lid 11 is opened, and a document is set face down on the platen glass 12. Then, when the lid 11 is closed and a start button is pressed, the image of the document is read to generate image data. The image reading sensor 13, which extends in the depth direction (direction perpendicular to the plane of FIG. 1) of the multifunction device 1, sequentially reads the image of a document while moving in the direction indicated by an arrow A, thus generating image data. The image reading unit 10 corresponds to an example of a reading unit according to an exemplary embodiment of the invention. In the following description, the image reading unit 10 will be sometimes referred to as "image input terminal (IIT)".

The multifunction device 1 includes a controller 21 that controls the overall operation of the multifunction device 1. The multifunction device 1 also includes an image processing unit 23. The image processing unit 23 acquires image data from, for example, an external device such as a personal computer (PC), a telephone communication device (not illustrated) provided inside the multifunction device 1, or the image reading unit 10, and performs image processing on the acquired image data. Further, the multifunction device 1 includes a user interface (UI) unit 22. The UI unit 22, which has multiple operation buttons including the start button, and a display screen, performs functions such as receiving an operational input from the user and displaying various information to the user. As will be described later, the image processing unit 23 functions as an example of a color correction unit according to an exemplary embodiment of the invention. A combination of the controller 21 and the UI unit 22 functions as an example of a discrimination unit according to an exemplary embodiment of the invention. Although the functions of the controller 21, the UI unit 22, and the image processing unit 23 may be implemented by hardware, in the exemplary embodiment, these functions are implemented by a control program.

Further, the multifunction device 1 includes an image forming unit 30 that forms an image by using colorants (for example, toners) of various colors corresponding to image data for various colors. An image is formed by the image forming unit 30 based on image data, such as image data obtained by image reading by the image reading unit 10, and image data acquired from an external device such as a PC or from a telephone communication device (not illustrated) provided inside the multifunction device 1. That is, the multifunction device 1 combines the functions of a copier, a printer, and a facsimile. The image forming unit 30 corresponds to an example of an image forming unit according to an exemplary embodiment of the invention.

The image forming unit 30 according to the exemplary embodiment includes multiple (four in this example) image forming engines 50. Each of the image forming engines 50 is an engine that forms a toner image by using a toner of a color corresponding to the image forming engine 50.

An intermediate transfer belt 61 in an endless form wrapped on rollers 62 and 63 is disposed over above the image forming engines 50. The intermediate transfer belt 61 circulates in the direction indicated by arrows C on a circulation path that extends along the four image forming engines 50.

The toner images of various colors formed on the image forming engines 50 are sequentially transferred by corresponding transfer units 55 onto the intermediate transfer belt 61 so as to overlap one another, thus forming a color image on the intermediate transfer belt 61. The color image on the intermediate transfer belt 61 is transported by the intermediate transfer belt 61, and transferred onto a sheet of paper by a second transfer unit 71.

A paper tray 31 that can be freely drawn out is disposed in a lower part of the image forming unit 30. The paper tray 31 accommodates, as a recording medium used for forming an image, a stack of sheets on which an image has not been formed yet.

A sheet accommodated in the paper tray 31 is picked up by a pickup roller 81, and transported by transport rollers 83 in the direction indicated by arrows D and E. Then, the color image on the intermediate transfer belt 61 is transferred to the sheet at the position of the second transfer unit 71.

The sheet with the transferred color image is further transported in the direction indicated by an arrow F to pass through a fixing unit 90. As heat and pressure are applied to the sheet in the fixing unit 90, the color image on the sheet is fixed onto the sheet.

After passing through the fixing unit 90, the sheet is further transported by transport rollers 85 in the direction indicated by an arrow G, and ejected onto a paper output tray 32 by eject rollers 86.

The multifunction device 1 has the function of simulating the color reproduction of a target device, which is another image forming device. In the exemplary embodiment, this simulate function is implemented by the control program mentioned above. Hereinafter, the simulate function will be described. In the following description, the multifunction device 1 will be sometimes referred to as "user's own device" as opposed to another image forming device, or as "simulating device" in the sense that the multifunction device 1 is a device that simulates the target device.

First, the basic principle of the simulate function employed in the exemplary embodiment will be described.

Figure 2:
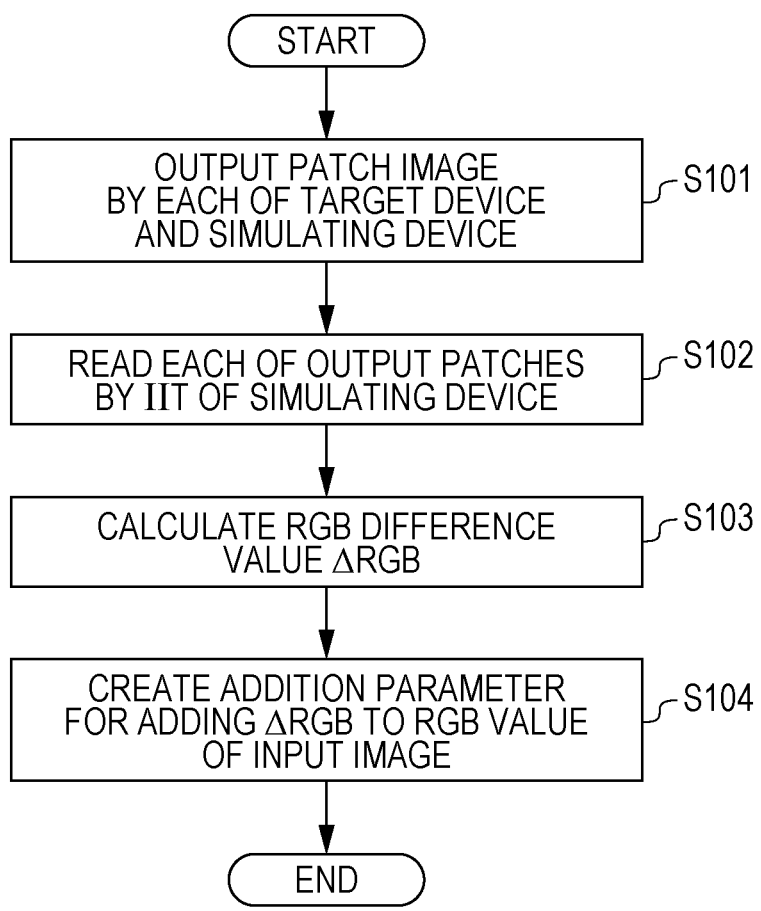
FIG. 2 is a flowchart of an operation sequence for a simulate function.

FIG. 2 is a flowchart of an operation sequence for the simulate function.

The simulate function is started when the user specifies a simulate mode with the UI unit 22 illustrated in FIG. 1.

When the simulate function is started, first, a patch output process is executed in step S101. In the patch output process, a patch image is output by each of a target device and the simulating device.

Figure 3:
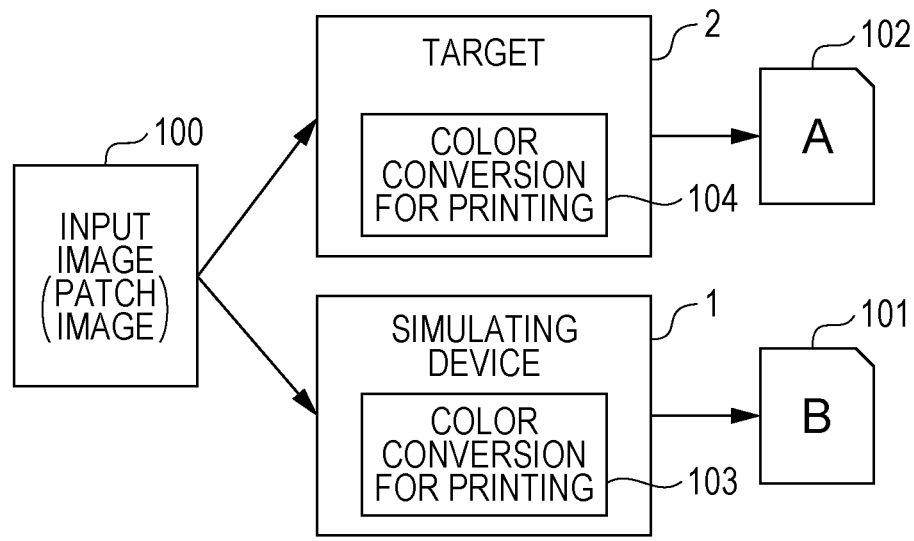
FIG. 3 illustrates a patch output process.

FIG. 3 illustrates a patch output process.

A patch image including a regular arrangement of patches is supplied to each of a target device 2 and the simulating device 1 as an input image 100 common to the two devices. For the simulating device 1, the input image 100 is stored in a storage element (not illustrated), and when the simulate mode is specified, the input image 100 is read into the controller 21 via the image processing unit 23. The color of the input image 100 is represented by, for example, an RGB value. The image processing unit 23 converts the RGB value into a CMYK value used for printing that corresponds to the image forming unit 30, by using a color conversion parameter 103 that is in, for example, a direct look up table (DLUT) format. In accordance with such a CMYK value, the image forming unit 30 then forms a print image 101 on a sheet for output. The color conversion parameter 103 used for converting a color representation format often also contains color correction components for purposes such as enhancing the color of the output image.

For the target device 2, the input image 100 is input by using an image input function of the target device 2, and then subjected to a color conversion parameter 104 of the target device 2. As a result, a print image 102 is output. The color conversion parameter 104 of the target device 2 typically differs from the color conversion parameter 103 of the simulating device 1 in its color correction components, for example. Features such as the hardware of the image forming unit 30 and the colorant used also typically differ between the simulating device 1 and the target device 2. Further, even if the simulating device 1 and the target device 2 are identical in features such as the color conversion parameter, hardware, and colorant used, the two devices sometimes still differ in their condition owing to aging. These and other differences typically cause the simulating device 1 and the target device 2 to differ in their color representation. As a result, the colors of individual patches differ between the print images 101 and 102.

Figure 4:
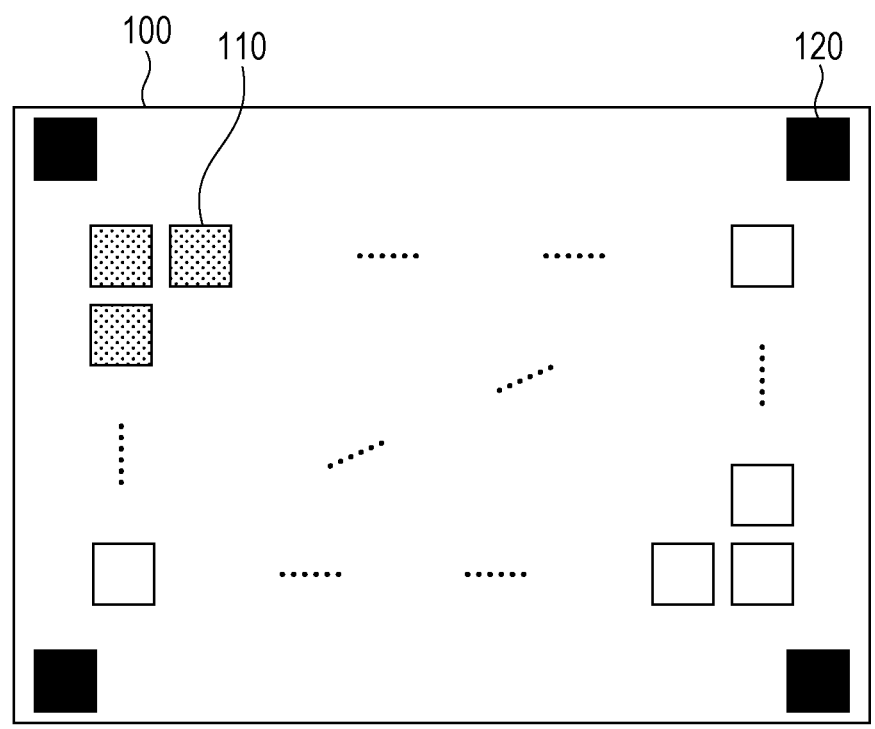
FIG. 4 illustrates an example of an input image.

FIG. 4 illustrates an example of an input image.

As described above, the input image 100 is a patch image, with patches 110 of various colors arranged in a regular fashion. A positioning patch 120, which is black in color and serves as a positional reference in reading the patches 110, is disposed at each of the four corners of the input image 100.

When the patch output process described above is executed in step S101 in FIG. 2, a patch reading process is executed next in S102 in the operation sequence illustrated in the flowchart of FIG. 2. In the patch reading process, the patches arranged in the print images 101 and 102 are read by the IIT (image reading unit) 10. Then, a difference calculation process is executed in step S103. In the difference calculation process, the difference value ΔRGB between the read values (RGB values) of the patches is calculated.

Figure 5:
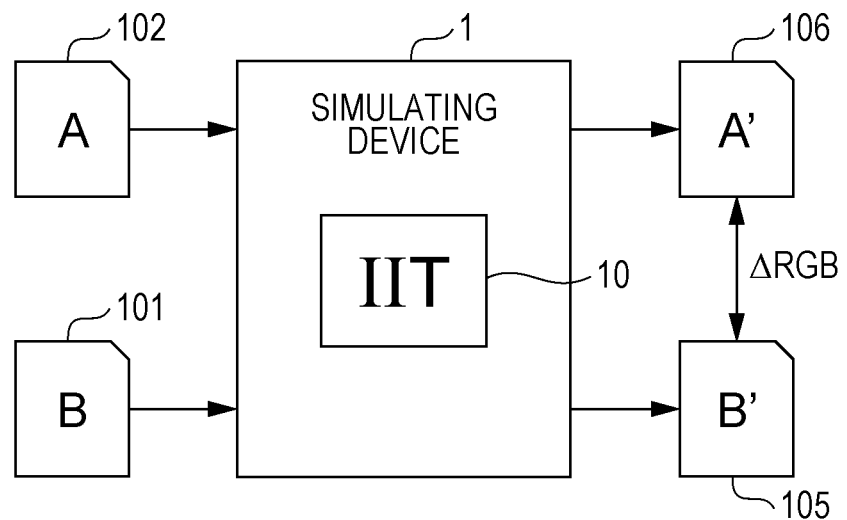
FIG. 5 illustrates a patch reading process and a difference calculation process.

FIG. 5 illustrates a patch reading process and a difference calculation process.

When the print image 101 output by the user's own device 1 is read by the IIT 10 of the user's own device 1, a read image 105 is obtained. In the read image 105, the color of each individual patch is represented by, for example, an RGB value. Likewise, the print image 102 output by the target device 2 is read to obtain a read image 106. Then, for each of the patches in the read images 105 and 106, the difference in RGB value, ΔRGB, is calculated by the controller 21 illustrated in FIG. 1. The difference value ΔRGB represents the difference in color representation between the simulating device 1 and the target device 2.

When the patch reading process and the difference calculation process described above are executed in steps S102 and S103 in FIG. 2, a parameter incorporation process is executed next in S104 in the operation sequence illustrated in the flowchart of FIG. 2. In the parameter incorporation process, an addition parameter for adding the difference value ΔRGB to the RGB value of the input image is created and incorporated into the user's own device 1.

Figure 6:
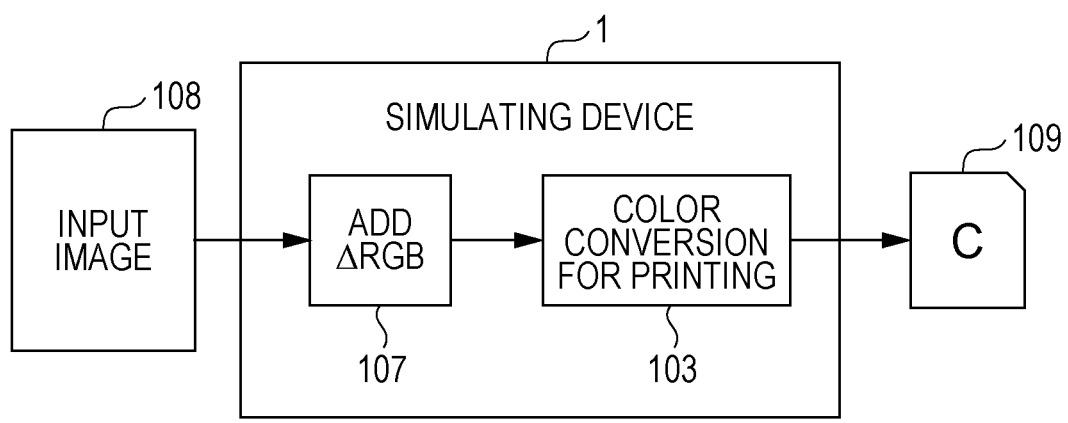
FIG. 6 illustrates a parameter incorporation process.

FIG. 6 illustrates a parameter incorporation process.

An addition parameter 107 for adding the difference value ΔRGB to the RGB value of an input image 108 is created as, for example, a parameter in the LUT format. The addition parameter 107 outputs an RGB value in response to an input of an RGB value. For each RGB value between individual RGB values corresponding to the colors of individual patches, the addition parameter 107 adds an appropriate color correction value through processing such as interpolation based on the difference value ΔRGB. The addition parameter 107 is incorporated into the image processing unit 23 of the simulating device 1 illustrated in FIG. 1, at a position before the color conversion parameter 103 used for printing. The addition parameter 107 adds the difference value ΔRGB to the RGB value of a given input image 108. The RGB data with the difference value ΔRGB added thereto is converted into CMYK data by the color conversion parameter 103 used for printing. A print image 109 is output in accordance with the CMYK data. The color reproduction of the print image 109 output in this way is close to the color reproduction on the target device 2, in comparison to the color reproduction on the simulating device 1 prior to the incorporation of the addition parameter 107. With the color correction using the addition parameter 107, the image processing unit 23 functions as an example of a color correction unit according to an exemplary embodiment of the invention.

In the above example, the addition parameter 107 is incorporated as a parameter different from the color conversion parameter 103 used for printing. Alternatively, since the color conversion parameter 103 often contains color correction components, the components of the addition parameter 107 may be included in the color conversion parameter 103 as a type of such color correction.

In the exemplary embodiment, the addition parameter 107 incorporated into the image processing unit 23 is not a parameter used on a regular basis but saved as one of multiple output modes that are selectively used. As such, the addition parameter 107 is selected by the user as needed.

FIG. 7 illustrates a screen for saving and selecting an output mode.

A save screen 130 displays a name entry field 131, a save button 132, and a keyboard 133. When the user operates the keyboard 133 to enter a given name in the name entry field 131, and then operates the save button 132, the addition parameter 107 is saved as an output mode.

A selection screen 140 displays a name 141 of each saved output mode in list form. An output mode is selected by a user's operation on a checkbox 142 provided beside each name. The addition parameter 107 corresponding to the output mode selected in this way is used as described above with reference to FIG. 6, allowing the simulating device 1 to simulate the color reproduction of the target device 2.

Now, a description will be given of a specific example in which the color reproduction of the target device 2 is simulated by the simulating device 1.

Figure 8:
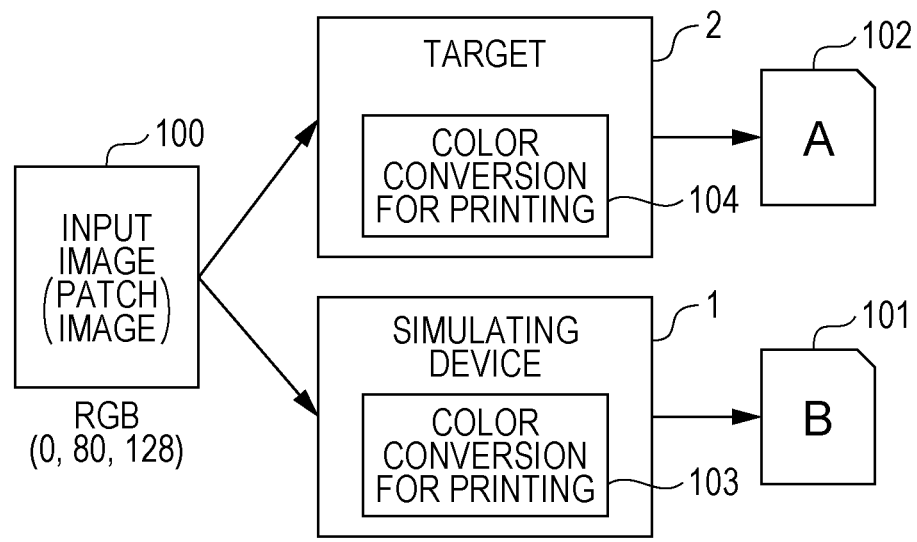
FIG. 8 illustrates a patch output process for a specific example of simulation.
Figure 9:
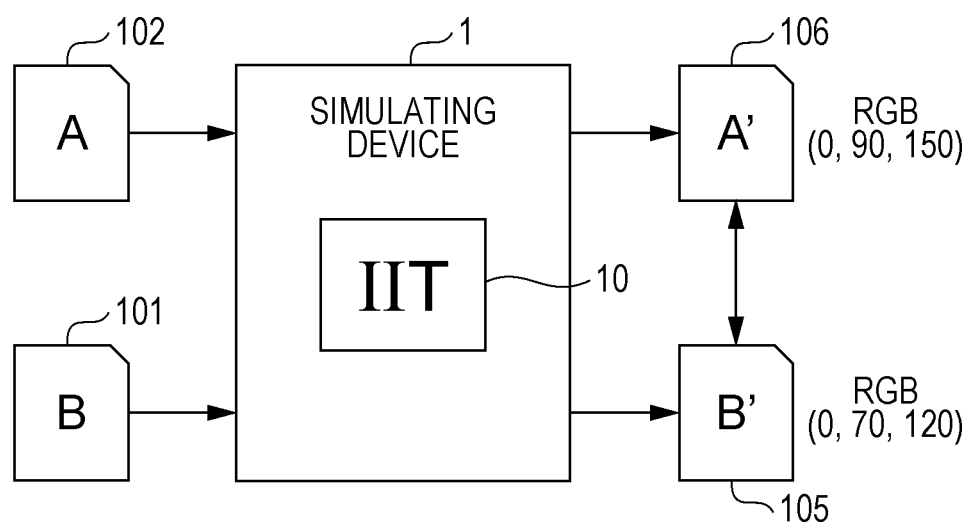
FIG. 9 illustrates a patch reading process and a difference calculation process for a specific example of simulation.
Figure 10:
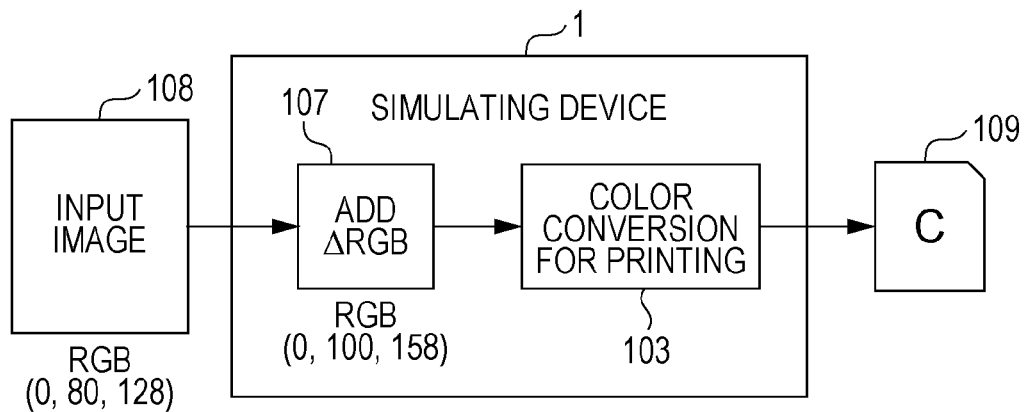
FIG. 10 illustrates a parameter incorporation process for a specific example of simulation.

FIGS. 8 to 10 each illustrate a specific example of simulation of color reproduction.

FIG. 8 illustrates a patch output process for a specific example of simulation.

In FIG. 8, (0, 80, 128) is shown as an example of an RGB value representing the color of a patch arranged in the input image 100. The input image 100 having the patch with this RGB value undergoes color conversions using the color conversion parameters 103 and 104 in the simulating device 1 and the target device 2, respectively. As a result, the print images 101 and 102 are output. A Lab value is measured by using a colorimeter for each of the print images 101 and 102 output in this way. The respective Lab values of the print images 101 and 102 are obtained as (65.8, 2.5, −18.0) and (61.8, −4.3, −25.1), with a color difference ΔE of 10.6.

FIG. 9 illustrates a patch reading process and a difference calculation process for a specific example of simulation.

When the print images 101 and 102 output as described above are read by the IIT 10 of the user's own device 1, the read images 105 and 106 are obtained. For this reading, shading compensation is performed to make the reading sensitivity within the read images 105 and 106 uniform. Further, multiple RGB values read within the same patch are averaged. As a result, for the RGB value (0, 80, 128) of the input image 100, the RGB values of the read images 105 and 106 are respectively obtained as (0, 90, 150) and (0, 70, 120). The difference value ΔRGB between these RGB values is obtained as (0, 20, 30).

FIG. 10 illustrates a parameter incorporation process for a specific example of simulation.

The addition parameter 107 for adding the difference value (0, 20, 30) to the input image 108 is incorporated into the user's own device 1. Thus, the difference value (0, 20, 30) is added to the RGB value (0, 80, 128) of the input image 108, resulting in an RGB value of (0, 100, 158). The image with the RGB value (0, 100, 158) is subjected to the color conversion parameter 103, and thus output as the print image 109. A Lab value measured with a colorimeter for the print image 109 output in this way is obtained as (62.3, −4.3, −25.1), resulting in a color difference ΔE of 0.5 when compared with the print image 102 output by the target device 2.

It is thus confirmed that the simulate function employed in the exemplary embodiment allows the simulating device 1 to provide a color reproduction close to that of the target device 2. Further, with the simulate function, the print images 101 and 102 respectively output by the user's own device 1 and the target device 2 are read by the IIT. The influence of, for example, aging of the user's own device 1 is thus eliminated, allowing the color reproduction of the target device 2 to be simulated with accuracy.

The patch reading process and the difference calculation process require the user's own device 1 to correctly identify the print images (documents) 101 and 102 produced by the user's own device 1 and the target device 2. If the two documents are erroneously identified, a difference value used to bring the color reproduction of the user's own device 1 closer to the color reproduction of the target device 2 has the opposite effect of bringing the color reproductions of the two devices farther apart from each other, resulting in a failed simulation.

Accordingly, in the multifunction device 1 according to the exemplary embodiment, a document discrimination function is incorporated in the simulate function to reduce mix-up of documents to ensure the success of simulation. In the exemplary embodiment, this document discrimination function is also implemented by the control program mentioned above.

Hereinafter, the simulate function in which the document discrimination function is incorporated will be described. The multifunction device 1 according to the exemplary embodiment provides three types of document discrimination function as "reading modes". When a simulate mode is to be specified, a reading mode is selected with the UI unit 22 illustrated in FIG. 1.

Figure 11:
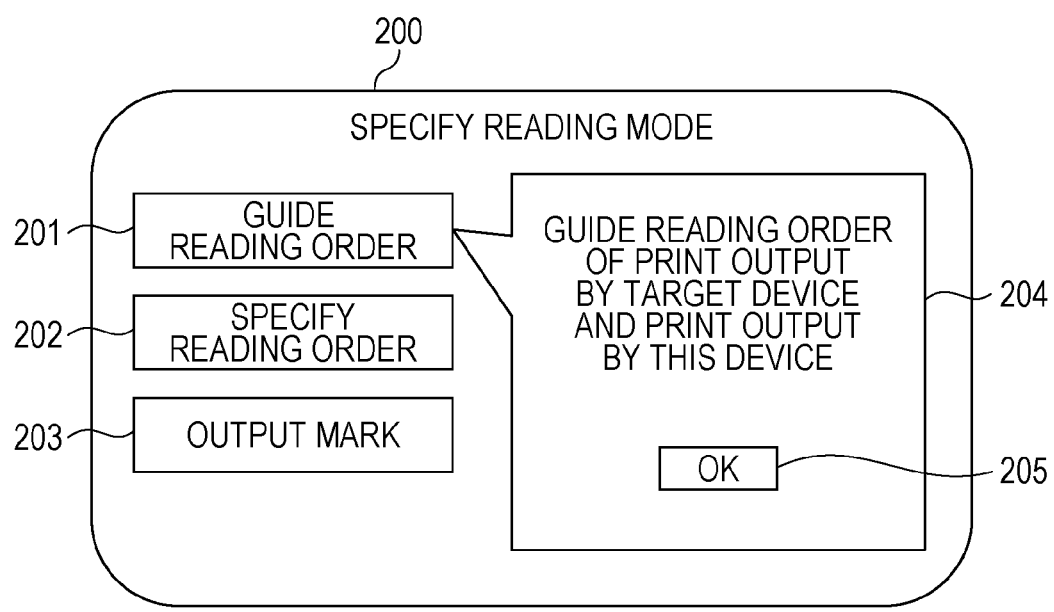
FIG. 11 illustrates a selection screen for selecting a reading mode.

FIG. 11 illustrates a selection screen for selecting a reading mode.

A selection screen 200, which is displayed on the display screen of the UI unit 22 illustrated in FIG. 1, has three selection buttons 201, 202, and 203, each used to select a corresponding one of three reading modes. When one of the selection buttons 201, 202, and 203 is operated, a Description field 204 opens. A text description about a reading mode corresponding to the operated selection button is displayed in the Description field 204. The reading mode is selected by operating an OK button 205 within the Description field 204.

The three reading modes to be selected on the selection screen 200 include a "reading-order guide mode" corresponding to the selection button 201, which is a first selection button, a "reading-order specifying mode" corresponding to the selection button 202, which is a second selection button, and a "mark output mode" corresponding to the selection button 203, which is a third selection button. Hereinafter, an operation sequence for the simulate function when each reading mode is selected will be described.

Figure 12:
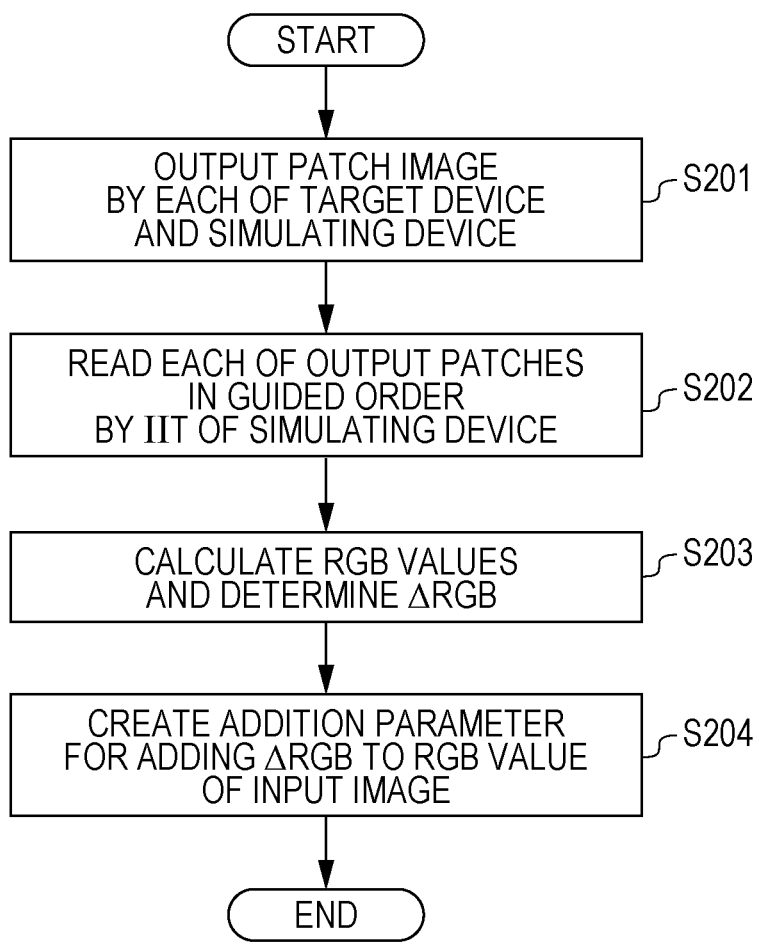
FIG. 12 is a flowchart of an operation sequence for a simulate function when a reading-order guide mode is selected.

FIG. 12 is a flowchart of an operation sequence for the simulate function when the reading-order guide mode is selected.

When the reading-order guide mode is selected, first, in the same manner as described above, a patch output process is executed in step S201. In the patch output process, a patch image is output by each of the simulating device 1 and the target device 2. Next, a patch reading process is executed in S202. In the patch reading process, the patches arranged in the print images 101 and 102 are read by the IIT (image reading unit) 10. For this patch reading process, in the reading-order guide mode, the user is instructed to read documents in a particular order through screen prompts provided on the UI unit 22 illustrated in FIG. 1. The user follows this instruction when setting each document on the IIT 10, thus avoiding mix-up of documents.

Figure 13:
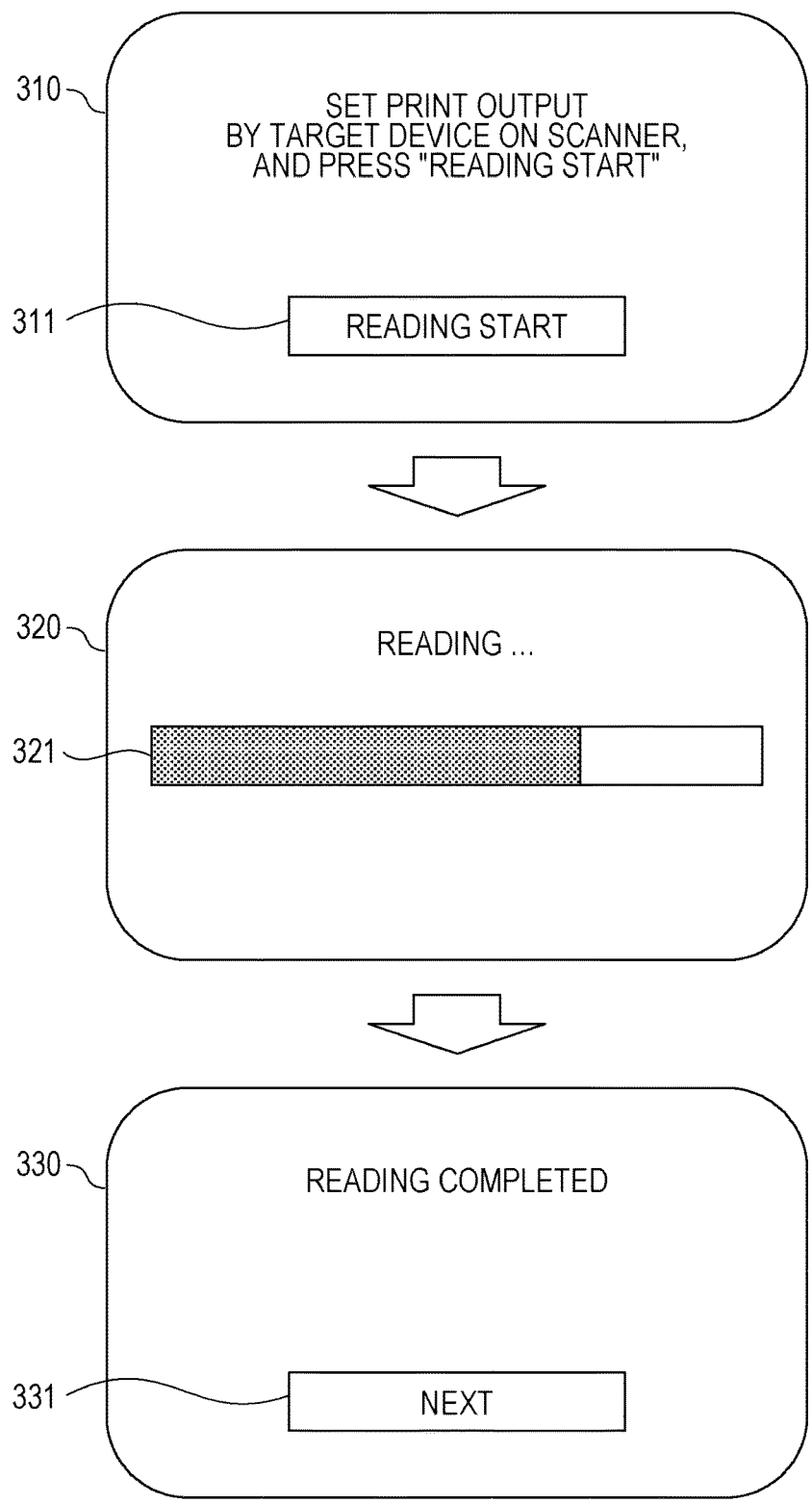
FIG. 13 illustrates the first part of screen prompts in a reading-order guide mode.
Figure 14:
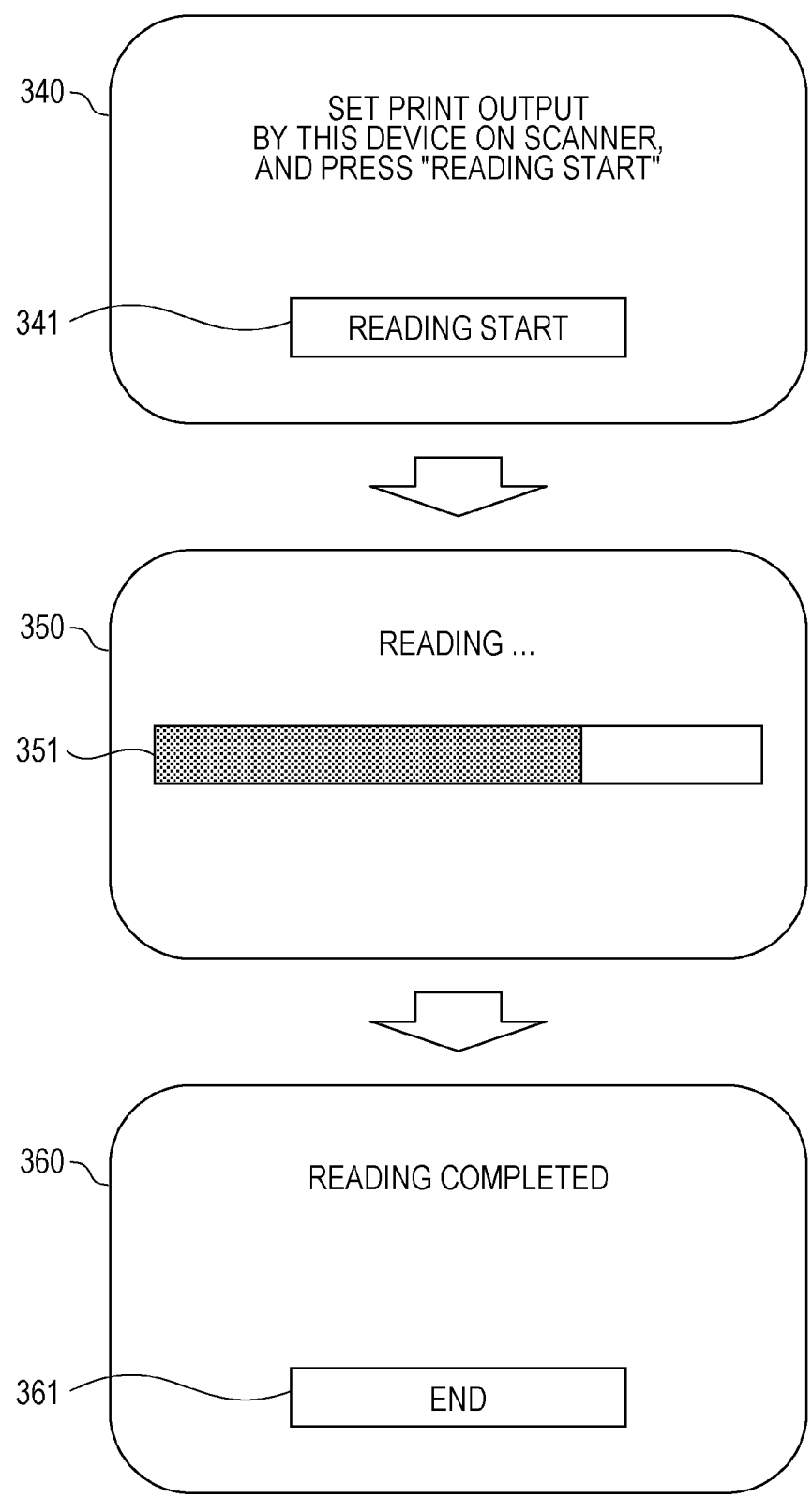
FIG. 14 illustrates the second part of screen prompts in a reading-order guide mode.

FIGS. 13 and 14 each illustrate screen prompts in the reading-order guide mode.

In the reading-order guide mode according to the exemplary embodiment, for example, the user is instructed to read print documents in order of the target device 2 and then the simulating device 1. Alternatively, the user may be instructed to read print documents in the reverse order.

Upon selecting the reading-order guide mode on the selection screen 200 illustrated in FIG. 11, as illustrated in FIG. 13, a guide is displayed on a guide screen 310 by the UI unit 22 illustrated in FIG. 1. This guide prompts the user to set, on the IIT 10, the print image 102 output by the target device 2. The user views this guide and sets the print image 102 output by the target device 2 on the IIT 10. Then, the user operates a reading start button 311 within the guide screen 310.

Reading is started by the IIT 10 in response to the operation of the reading start button 311. While the print image 102 is read, a progression screen 320 opens, and the progress of reading is indicated by a progress bar 321. The data of the read image is sent to the controller 21 illustrated in FIG. 1. In the controller 21, the print image 102 read at this point is identified as a print image output by the target device 2.

Once the reading of the print image 102 is complete, a completion report screen 330 opens to inform the user that the reading is complete. After confirming that the reading is complete, the user operates an OK button 331, allowing the patch reading process to proceed.

In response to the operation of the OK button 331, as illustrated in FIG. 14, a guide is displayed on a guide screen 340 by the UI unit 22 illustrated in FIG. 1. This guide prompts the user to set, on the IIT 10, the print image 101 output by the user's own device 1. The user views this guide and sets the print image 101 output by the user's own device 1 on the IIT 10. Then, the user operates a reading start button 341 within the guide screen 340.

In response to the operation of the reading start button 341, reading is started by the IIT 10, a progression screen 350 opens, and the progress of reading is indicated by a progress bar 351. The data of the read image is also sent to the controller 21 illustrated in FIG. 1. In the controller 21, the print image 101 read at this point is identified as a print image output by the user's own device 1.

Once the reading of the print image 101 is complete, a completion report screen 360 opens to inform the user that the reading is complete. After confirming that the reading is complete, the user operates an End button 361 to end the patch reading process.

The operation of the controller 21 and the UI unit 22 described above corresponds to an example of operation of the discrimination unit according to an exemplary embodiment of the invention.

When the patch reading process is executed in this way in step S202 illustrated in FIG. 12, a difference calculation process is executed next in step S203. In the difference calculation process, the difference value ΔRGB between the read values (RGB values) of the patches is calculated.

Further, a parameter incorporation process is executed in step S204. In the parameter incorporation process, an addition parameter for adding the difference value ΔRGB to the RGB value of the input image is created and incorporated into the simulating device 1.

Next, a description will be given of an operation sequence for the simulate function when the "reading-order specifying mode" is selected as a reading mode.

Figure 15:
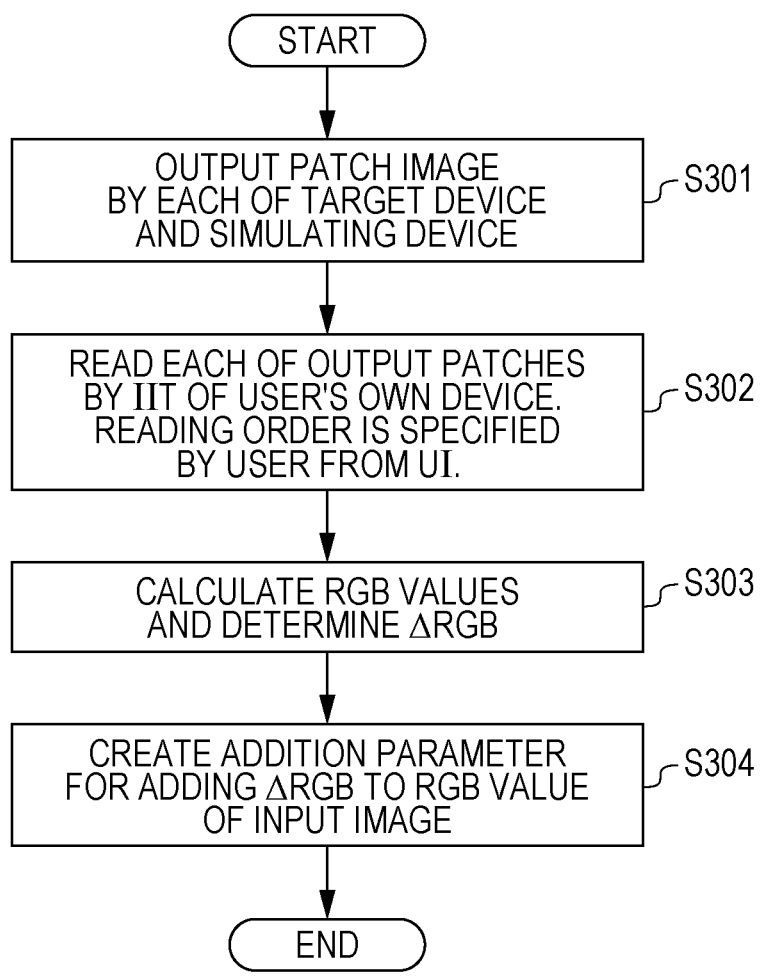
FIG. 15 is a flowchart of an operation sequence for a simulate function when a reading-order specifying mode is selected.

FIG. 15 is a flowchart of an operation sequence for the simulate function when the reading-order specifying mode is selected.

When the reading-order specifying mode is selected, first, in the same manner as described above, a patch output process is executed in step S301. In the patch output process, a patch image is output by each of the simulating device 1 and the target device 2. Next, a patch reading process is executed in S302. In the patch reading process, the patches arranged in the print images 101 and 102 are read by the IIT (image reading unit) 10. For this patch reading process, in the reading-order specifying mode, the user specifies the order in which to read documents, through screen prompts provided on the UI unit 22 illustrated in FIG. 1.

Figure 16:
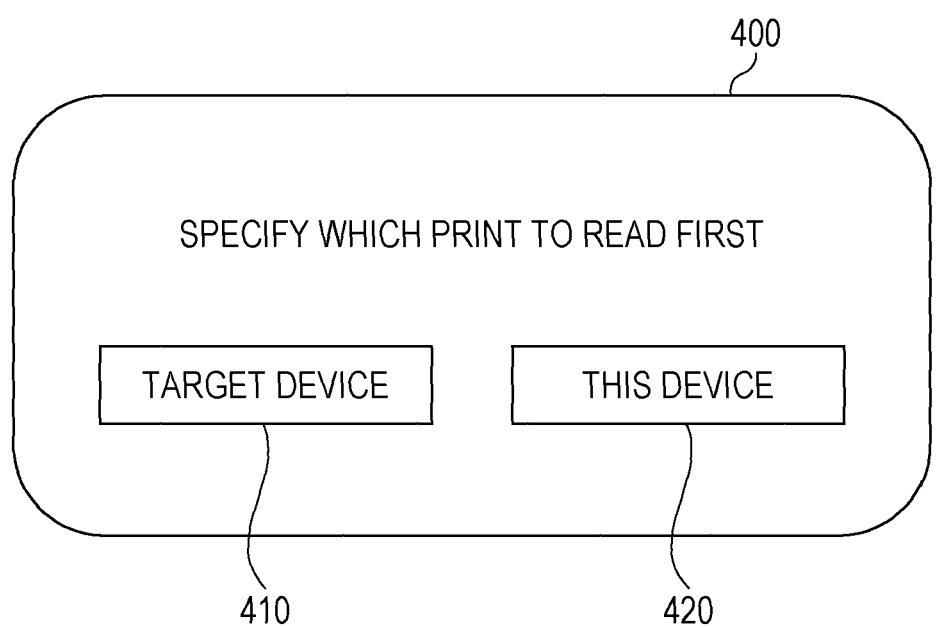
FIG. 16 illustrates screen prompts in a reading-order specifying mode.

FIG. 16 illustrates screen prompts in the reading-order specifying mode.

In the reading-order specifying mode, a specifying screen 400 is displayed for the patch reading process. The specifying screen 400 provides a target specifying button 410 for specifying the target device 2, and a user's own device specifying button 420 for specifying the user's own device 1. The user operates one of the buttons 410 and 420 to specify the print image to be read first, thus specifying the order in which to read images.

After thus specifying the reading order on the specifying screen 400, the user is then guided to read print images in the order specified by the user himself or herself, by screen prompts similar to the screen prompts illustrated in FIGS. 13 and 14. That is, if the reading order is specified such that the print image output by the target device 2 is to be read first, the same screen prompts as those illustrated in FIGS. 13 and 14 are given, and if the reading order is specified such that the print image output by the user's own device 1 is to be read first, screen prompts with the words "target device" and "this device" switched from those in FIGS. 13 and 14 are given. Then, the user sets each document on the IIT 10 in the order specified by the user himself or herself.

When the patch reading process is executed in this way in step S302 illustrated in FIG. 15, a difference calculation process is executed next in step S303. In the difference calculation process, the difference value ΔRGB between the read values (RGB values) of the patches is calculated.

Further, a parameter incorporation process is executed in step S304. In the parameter incorporation process, an addition parameter for adding the difference value ΔRGB to the RGB value of the input image is created and incorporated into the simulating device 1.

Next, a description will be given of an operation sequence for the simulate function when the "mark output mode" is selected as a reading mode.

Figure 17:
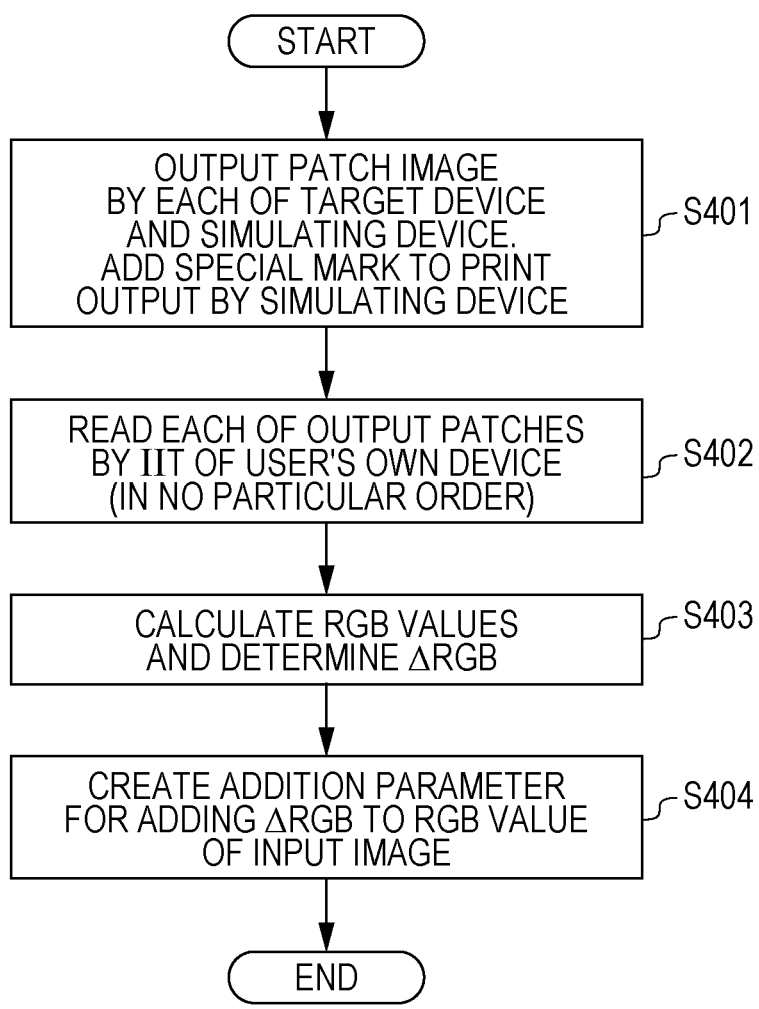
FIG. 17 is a flowchart of an operation sequence for a simulate function when a mark output mode is selected.

FIG. 17 is a flowchart of an operation sequence for the simulate function when the mark output mode is selected.

When the mark output mode is selected, first, in the same manner as described above, a patch output process is executed in step S401. In the patch output process, a patch image is output by each of the simulating device 1 and the target device 2. In the mark output mode, when outputting each patch image, the simulating device 1 also outputs a mark indicating the user's own device 1. This mark corresponds to an example of discrimination image information for identifying the user's own device 1.

Figure 18:
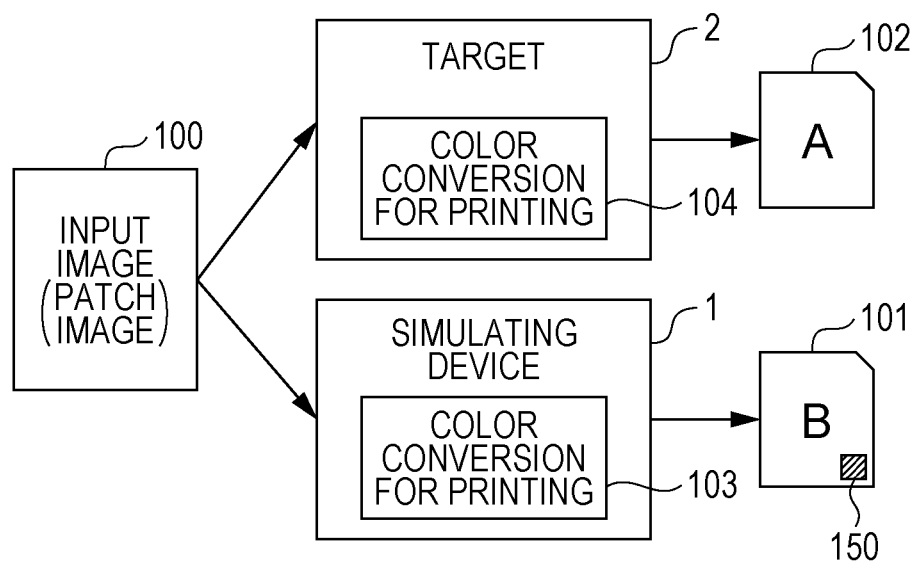
FIG. 18 illustrates a patch output process when a mark output mode is selected.

FIG. 18 illustrates a patch output process when the mark output mode is selected.

A patch image is supplied to each of the target device 2 and the simulating device 1 as the input image 100 that is common to the two devices. The target device 2 outputs the print image 102 obtained by applying a color conversion using the color conversion parameter 104 to the input image 100. In the simulating device 1, a color conversion using the color conversion parameter 103 is applied to the input image 100, and the controller 21 adds a mark 150 indicating the user's own device 1 to the input image 100. Then, the print image 101 with the mark 150 added thereto is output.

A specific example of the mark 150 described above would be a patch obtained by changing the positioning patch 120, which is black in color and provided at each of the four corners of the input image 100 illustrated in FIG. 4, to a red-colored patch. Alternative examples of marks that may be used as the mark 150 indicating the user's own device 1 include marks placed separately from the positioning patch 120 or the patches 110 of various colors, and marks that differ in shape from rectangular patches, for example, circular or triangular marks.

When a patch output process is executed in step S401 illustrated in FIG. 17 in which the print image 101 with the mark 150 produced by the user's own device, and the print image 102 without the mark 150 produced by the target device 2 are output, the processing proceeds to the next step S402. Then, a patch reading process is executed to read the print images 101 and 102 by the IIT 10 of the user's own device. For this patch reading process, images are discriminated from each other based on the mark 150. Then, a difference calculation process is executed in step S403. In the difference calculation process, the difference value ΔRGB between the read images (RGB values) of the patches is calculated.

Figure 19:
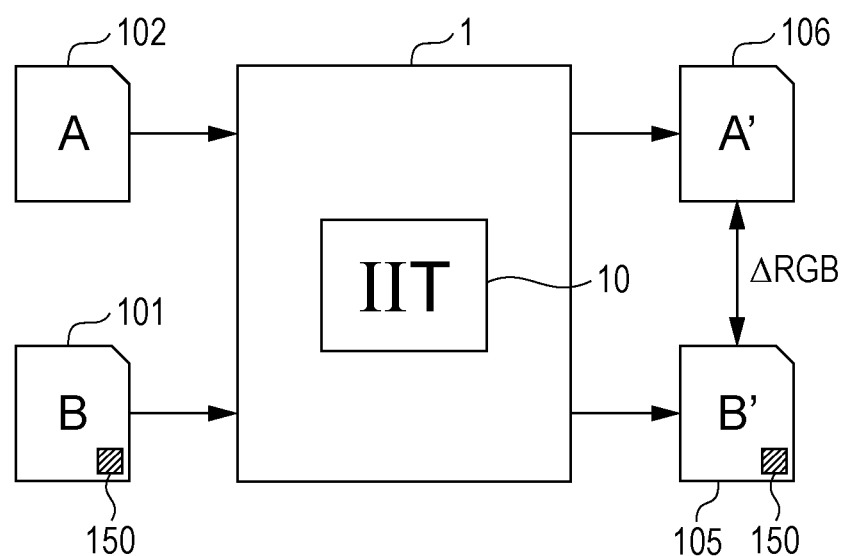
FIG. 19 illustrates a patch reading process and a difference calculation process when a mark output mode is selected.

FIG. 19 illustrates a patch reading process and a difference calculation process when the mark output mode is selected.

In the mark output mode as well, the print image 101 produced by the user's own device 1 and the print image 102 produced by the target device 2 are set by the user on the IIT 10 of the user's own device 1, and read. In the mark output mode, these images may be read in any order at this time. When the print images 101 and 102 are read by the IIT 10, the read images 105 and 106 are respectively obtained, which are sent to the controller 21 illustrated in FIG. 1. Then, the controller 21 detects, for each of the read images 105 and 106, whether the mark 150 is present in the read image. The presence or absence of the mark 150 is used by the controller 21 to accurately determine which one of the read images 105 and 106 is obtained from the print image 101 produced by the user's own device 1.

Figure 20:
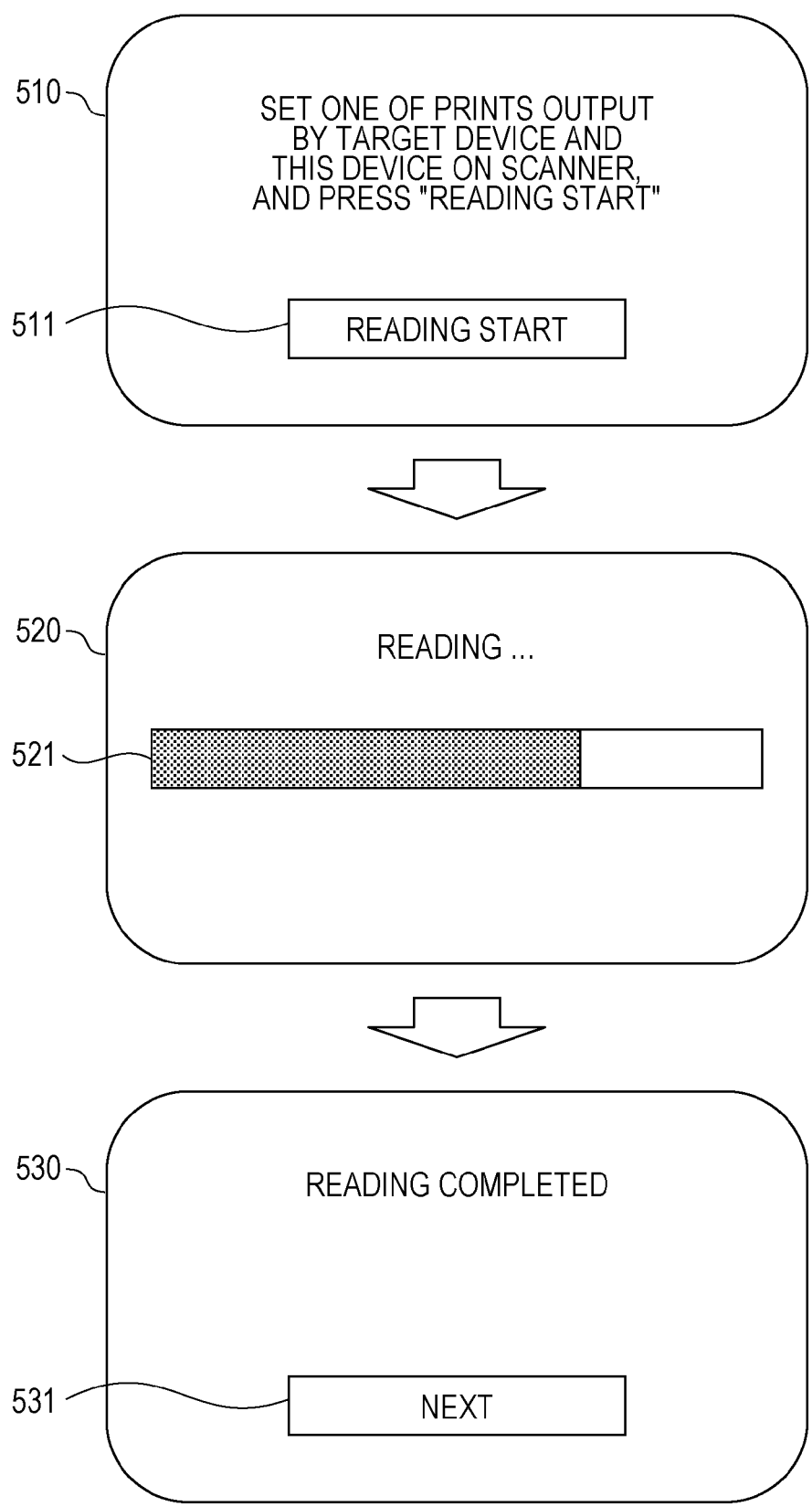
FIG. 20 illustrates the first part of screen prompts in a patch reading process when a mark output mode is selected.
Figure 21:
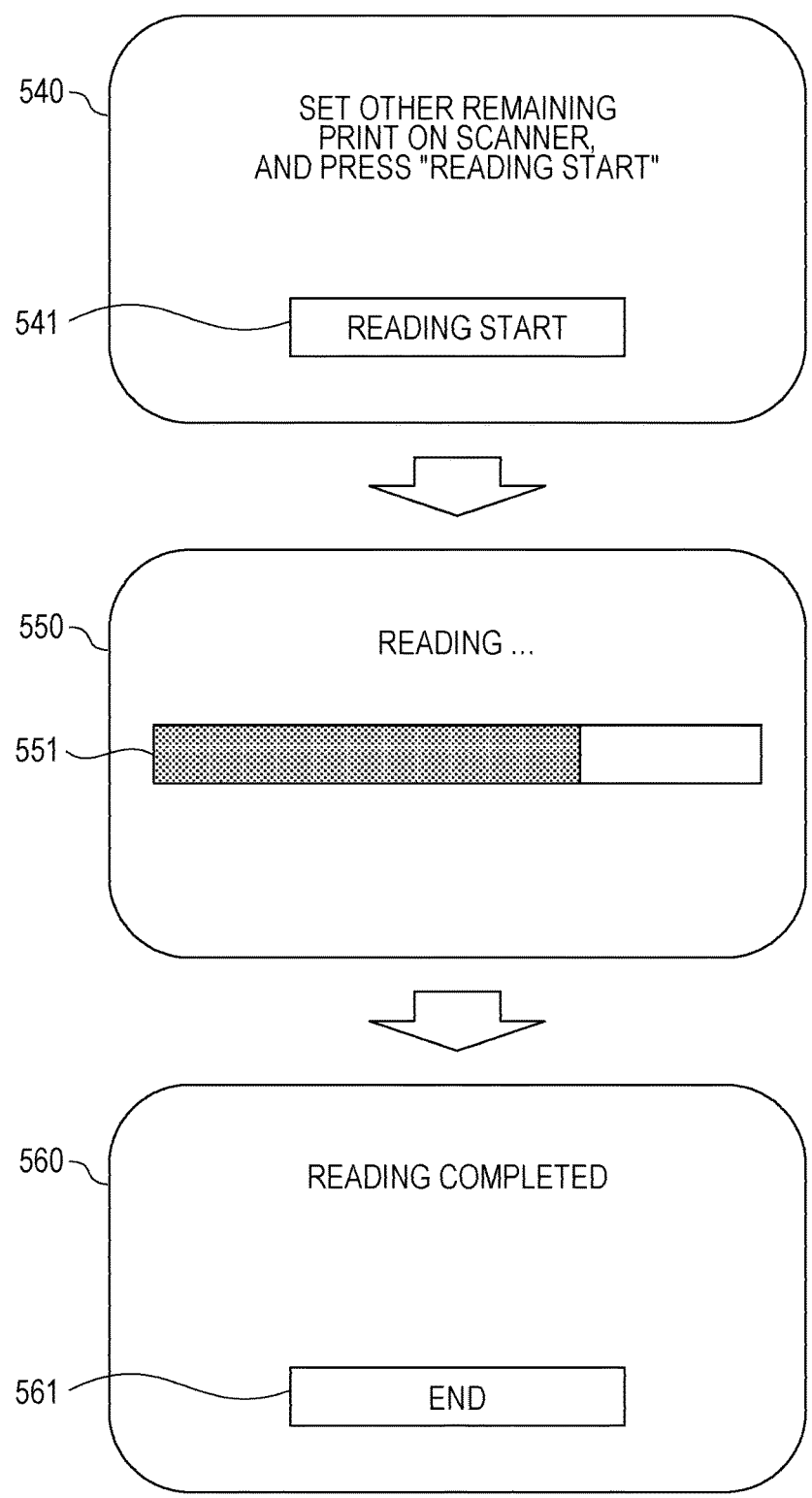
FIG. 21 illustrates the second part of screen prompts in a patch reading process when a mark output mode is selected.

FIGS. 20 and 21 illustrate screen prompts provided during the patch reading process when the mark output mode is selected.

In the mark output mode, as illustrated in FIG. 20, a guide is displayed on a guide screen 510 by the UI unit 22 illustrated in FIG. 1. This guide prompts the user to set, on the IIT 10, one of the print images 101 and 102 respectively produced by the user's own device 1 and the target device 2. The user views this guide and sets any given one of the print images 101 and 102 on the IIT 10. Then, the user operates a reading start button 511 within the guide screen 510.

Reading is started by the IIT 10 in response to the operation of the reading start button 511. While a print image is read, a progression screen 520 opens, and the progress of reading is indicated by a progress bar 521. Once the reading of the print image is complete, a completion report screen 530 opens to inform the user that the reading is complete. After confirming that the reading is complete, the user operates an OK button 531, allowing the patch reading process to proceed.

In response to the operation of the OK button 531, as illustrated in FIG. 21, a guide is displayed on a guide screen 540 by the UI unit 22 illustrated in FIG. 1. This guide prompts the user to set the remaining print image on the IIT 10. The user views this guide and sets the remaining print image on the IIT 10. Then, the user operates a reading start button 541 within the guide screen 540. In response to the operation of the reading start button 541, reading is started by the IIT 10, a progression screen 550 opens, and the progress of reading is indicated by a progress bar 551.

Once the reading of the print image is complete, a completion report screen 560 opens to inform the user that the reading is complete. After confirming that the reading is complete, the user operates an End button 561 to end the patch reading process.

Further, a parameter incorporation process is executed in step S404. In the parameter incorporation process, an addition parameter for adding the difference value ΔRGB to the RGB value of the input image is created and incorporated into the simulating device 1.

Although the foregoing description is directed to a case in which the user selects a reading mode from among multiple reading modes, the discrimination unit according to an exemplary embodiment of the invention may execute only one of those reading modes.

Although the foregoing description is directed to a case in which the image forming unit used employs a so-called electrophotographic system, the image forming unit according to an exemplary embodiment of the invention may employ a system other than the electrophotographic system, for example, an inkjet system.

Although the foregoing description is directed to a case in which a multifunction device is used as an exemplary embodiment of the image forming device, any device including a reading unit, for example, a copier, may be used as an example of the image forming device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image forming device comprising:
   an image forming unit that forms an image on a recording medium in response to an input of image data representing the image and, when forming the image, also generates discrimination image information used for discrimination;
   a reading unit that reads a first image formed by the image forming device, and a second image formed by another image forming device to respectively generate a first read image and a second read image, the first image and the second image being formed based on identical image data; and
   a computer programmed to:
      discriminate the first read image and the second read image from each other based on the discrimination image information; and
      perform, on the image formed by the image forming unit, a color correction that cancels out a difference in color between the first read image and the second read image.

2. An image forming device comprising:
   an image forming unit that forms an image on a recording medium in response to an input of image data representing the image;
   a reading unit that reads a first image formed by the image forming device, and a second image formed by another image forming device to respectively generate a first read image and a second read image, the first image and the second image being formed based on identical image data; and
   a computer programmed to:
      display a guide about an order in which the first image and the second image are to be read by the reading unit;
      discriminate the first read image and the second read image from each other in the order; and
      perform, on the image formed by the image forming unit, a color correction that cancels out a difference in color between the first read image and the second read image.

3. An image forming device comprising:
   an image forming unit that forms an image on a recording medium in response to an input of image data representing the image;
   a reading unit that reads a first image formed by the image forming device, and a second image formed by another image forming device to respectively generate a first read image and a second read image, the first image and the second image being formed based on identical image data; and
   a computer programmed to:
      receive a specification of an order in which the first image and the second image are to be read by the reading unit;
      discriminate the first read image and the second read image from each other in the order; and
      perform, on the image formed by the image forming unit, a color correction that cancels out a difference in color between the first read image and the second read image.

* * * * *